(12) United States Patent
Anders et al.

(10) Patent No.: US 7,381,438 B2
(45) Date of Patent: Jun. 3, 2008

(54) LIQUID INFUSION AND TENDERIZATION PROCESS, APPARATUS, AND PRODUCT

(75) Inventors: Gary H. Anders, Lowell, AR (US); Daniel W. King, Springdale, AR (US)

(73) Assignee: AK Tood Technology, Inc., Springdale, AR (US)

( * ) Notice: Subject to any disclaimer, the term of this patent is extended or adjusted under 35 U.S.C. 154(b) by 1392 days.

(21) Appl. No.: 09/909,913

(22) Filed: Jul. 20, 2001

(65) Prior Publication Data
US 2002/0012726 A1 Jan. 31, 2002

Related U.S. Application Data

(60) Provisional application No. 60/219,895, filed on Jul. 21, 2000.

(51) Int. Cl.
*A23L 1/318* (2006.01)
(52) U.S. Cl. .................... 426/281; 426/506; 426/513
(58) Field of Classification Search ............... 426/92, 426/281, 506, 513; 99/516, 534–536, 443 C
See application file for complete search history.

(56) References Cited

U.S. PATENT DOCUMENTS 3,347,679 A * 10/1967 Nordin .................... 426/281
3,663,233 A * 5/1972 Keszler .................... 426/281
4,012,808 A 3/1977 Strong
4,345,514 A * 8/1982 Morley ...................... 99/349
4,409,704 A 10/1983 Seiffhart
4,467,497 A * 8/1984 Peterson et al. ............ 452/174
4,657,771 A 4/1987 Gould
5,082,678 A * 1/1992 Margolis .................... 426/281
5,176,071 A * 1/1993 Klaassen .................... 99/533
5,564,332 A * 10/1996 Ludwig ...................... 99/472

FOREIGN PATENT DOCUMENTS

| DE | 3603677 A1 | 9/1986 |
| EP | 0 510 868 A1 | 10/1992 |
| GB | 957356 | 5/1964 |

* cited by examiner

*Primary Examiner*—Drew Becker
(74) *Attorney, Agent, or Firm*—Fellers, Snider, Blankenship, Bailey & Tippens, P.C.; Dennis D. Brown

(57) ABSTRACT

A method and apparatus of treating food items having muscle protein and a product produced by the inventive apparatus and method. The inventive method preferably utilizes the inventive apparatus to (a) continuously press the food items using a pliable material which conforms to and at least partially surrounds the food items when pressing and/or (b) infuse the food items with a treatment liquid preferably by impacting the food items while they are at least partially suspended in the solution.

48 Claims, 11 Drawing Sheets

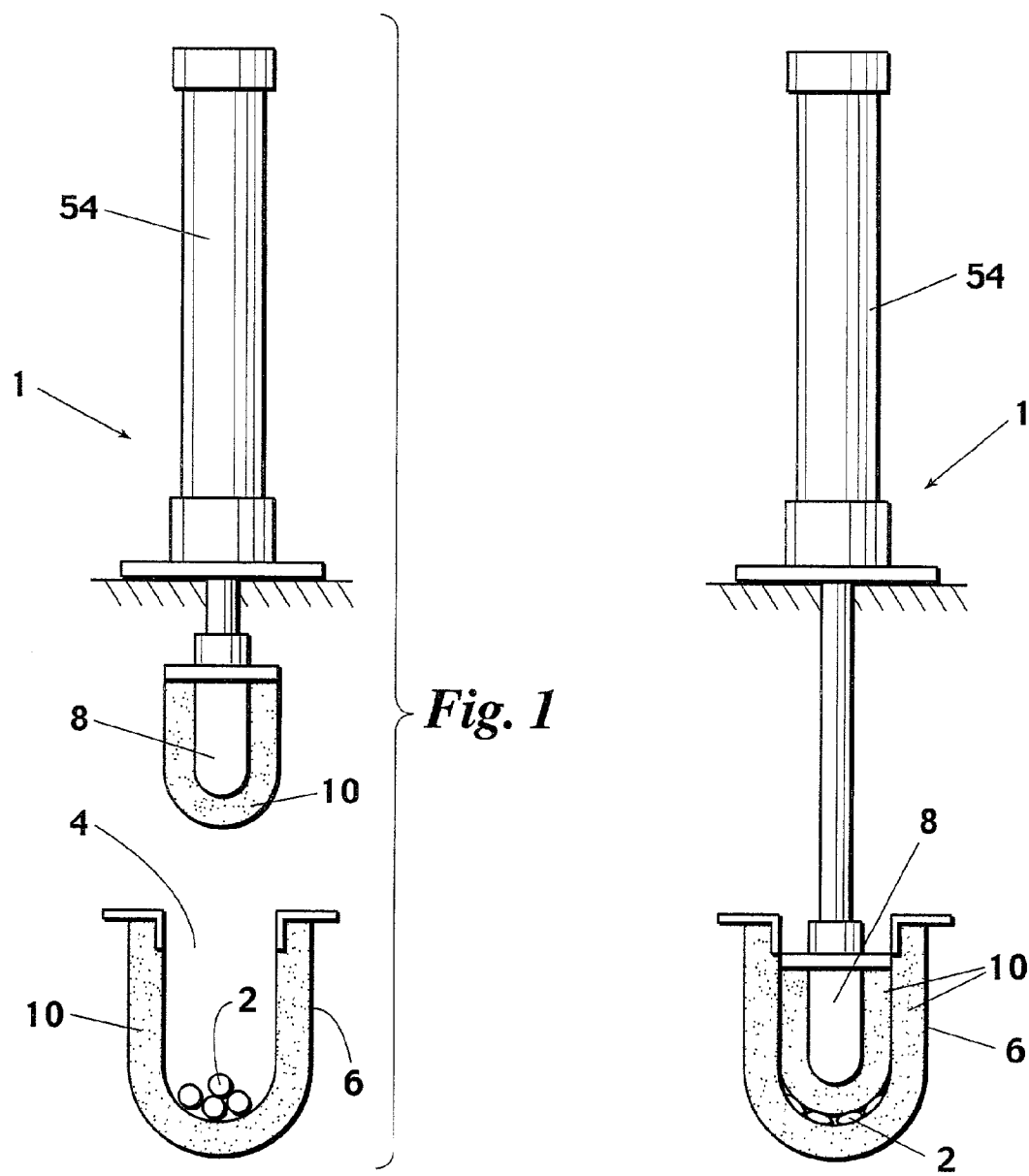

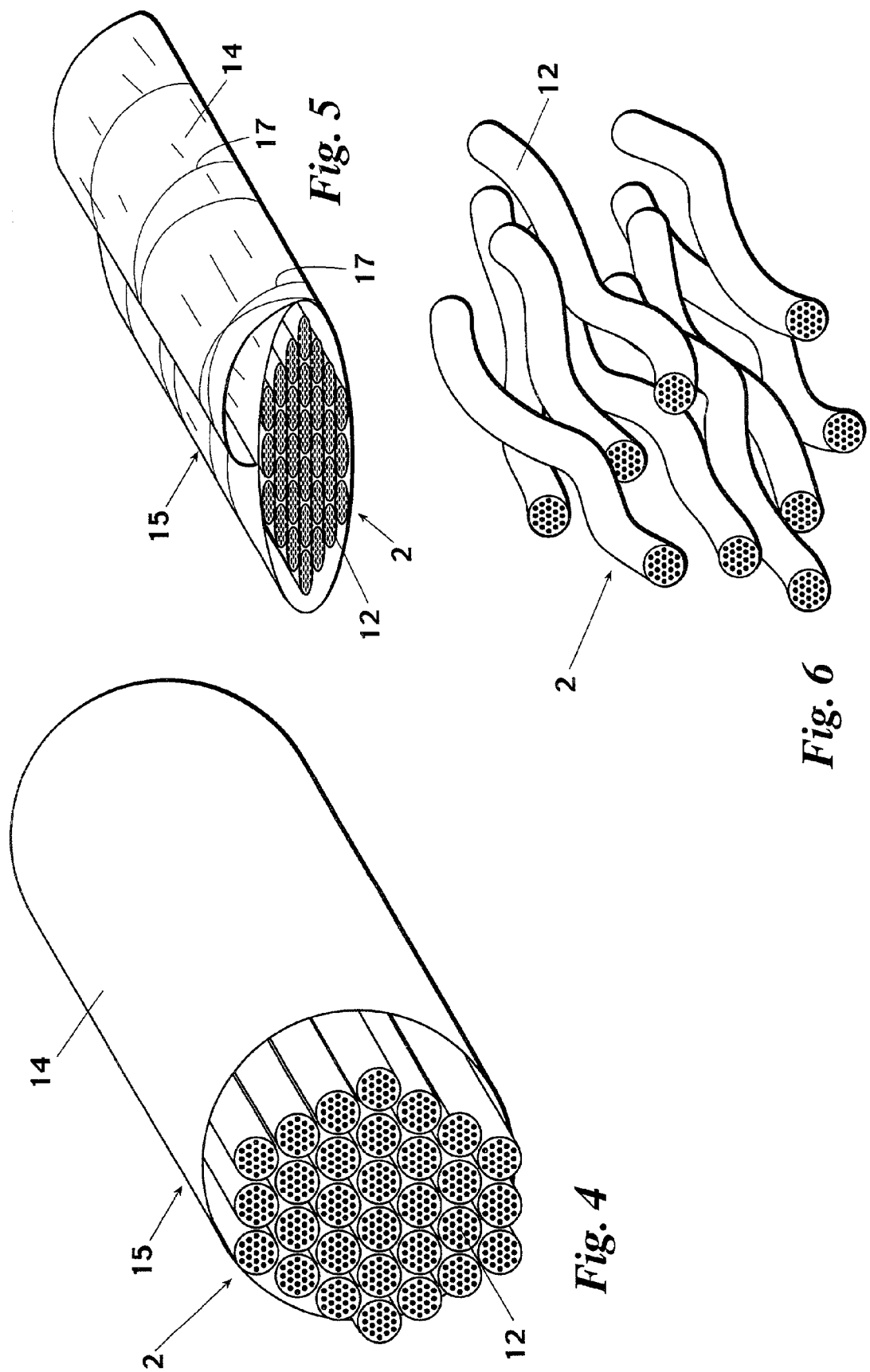

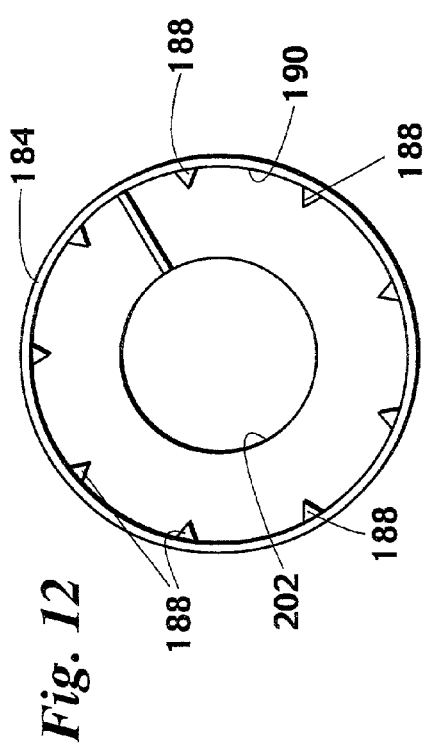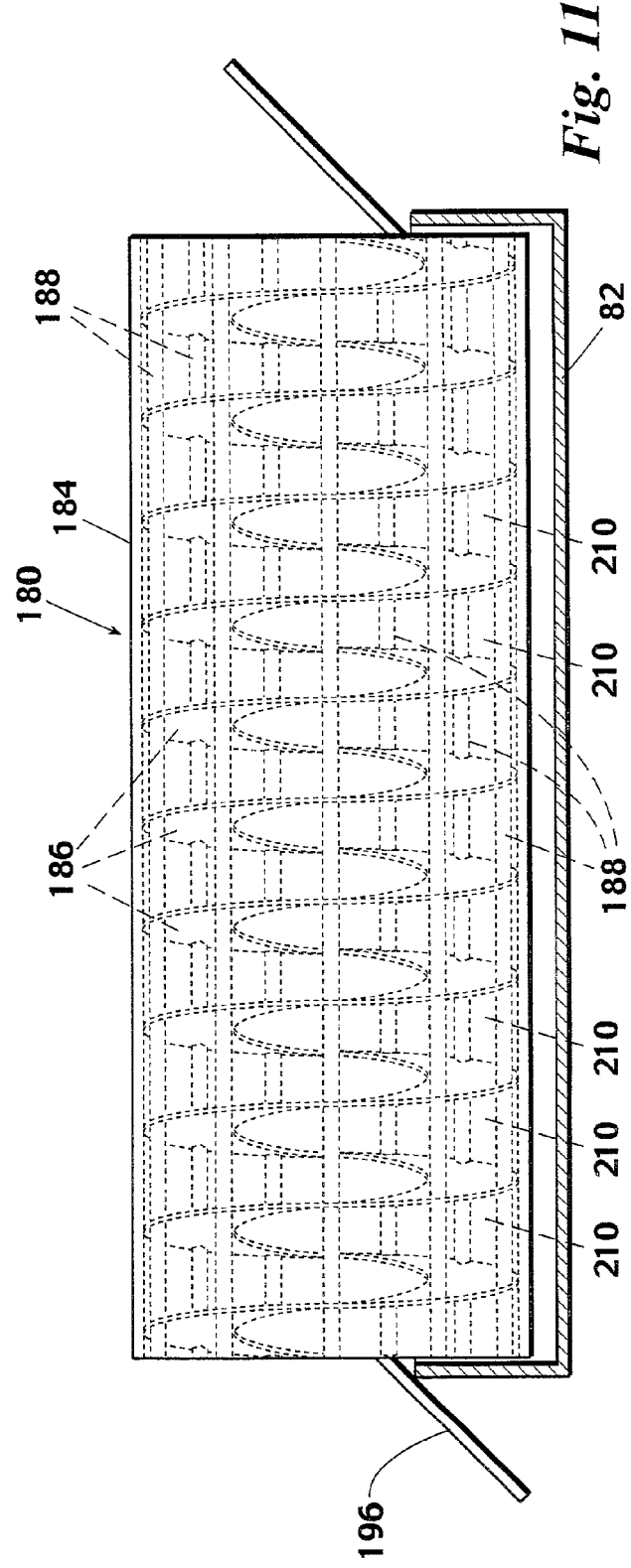

LIQUID INFUSION AND TENDERIZATION PROCESS, APPARATUS, AND PRODUCT

This application claims the benefit of United States Provisional Patent Application Ser. No. 60/219,895, filed Jul. 21, 2000.

FIELD OF THE INVENTION

The present invention relates to apparatuses and methods for tenderizing and infusing muscle protein products with marinades and/or other liquids and to the products produced by such apparatuses and methods.

BACKGROUND OF THE INVENTION

Infusion, curing, pickling, injection and marination of meat and food substances has been in practice for many years. The initial most common method was to submerge the material in a solution of marination, pickle solution, or brine for long periods of time. This could take one or more days depending upon the level of uptake of the solution. The industry progressed from that practice to either a needle injection or a massaging method using an upright drum, filled with product and the marination solution, with an agitator. The multi-vane agitator would travel in slow rotational speed in one direction for several minutes and then in the reverse direction. This process would take 20 to 30 hours for marination of meat.

That practice progressed to turning the drum on its side, loading the meat and marination solution, closing the doors and rotating the drum. Vanes were built into the walls of the drum to create more massaging action on the product. This method would later be enhanced by adding a vacuum pump to evacuate the air inside the drum, thus keeping down foaming and removing air from the product. This method would take 20 to 30 minutes to complete a marination cycle. These drums would hold on an average 3000 to 5000 pounds of product, with some as high as 20,000 pounds.

Typical process enhancements would be to pre-chill the product down to near freezing levels to stiffen the muscles, thus causing more massaging during tumbling. CO2 would also be injected into the tumbler during rotation or a refrigerated jacket around the outside of the tumbler would be used to further chill the product.

In these prior processes, the meat massaging action would result primarily from (a) the meat pieces themselves imparting forces one to another, (b) the vanes (if present) creating a force on the bulk of the meat mass, and (c) the meat falling into the drum wall and onto other pieces due to the rotation of the drum. None of these methods provide direct massaging of each individual piece of meat. Moreover, these meat marinators/massagers operate in a batch mode off-line from the main processing line. Marinated meat is staged into the constant flow of a processing line either by surge hoppers, conveyers, or push carts typically loaded with 300 to 500 pounds of meat.

The marination pick-up achieved in these prior processes has usually been limited to the exterior portions of the meat substance with only slight infusion into the body of the muscle. Because the meat pieces themselves are massaging one another, the tougher muscles receive much less massaging pick up and thus much less infusion of marination. The structure of this meat is very tight, allowing for minimum infusion of external liquid.

The vacuum tumbler and other conventional tumbling systems used heretofore have typically been "dry" marination systems wherein the amount of marination fluid placed in the tumbler equals or only minimally exceeds the amount of fluid which is actually infused into the product. For example, when processing poultry wings to obtain an eight percent pickup of marination solution, only eight pounds of marination fluid would be placed in the batch tumbling drum per each 100 pounds of wings. Thus, as the liquid becomes fully absorbed into the bulk product, the individual pieces thereof tumble onto and collide with each other.

Although the type of colliding interaction experienced in prior art tumblers can beneficially act to move protein from the interior of the product to the surface, it undesirably limits the amount of marinade pick up which can be achieved. The internal pressure created by the weight and momentum of the product pieces not only causes internal protein to flow to the surface but also causes the marinade solution to flow out of, rather than into, the product.

Additional disadvantages and shortcomings of the prior art batch tumbling systems are that (a) they typically require the installation, operation, and maintenance of vacuum pumps, (b) because the individual pieces of each product batch must be held in hoppers and fed to downstream processing units over a period of time, significant differences in drying, aging, moisture content, etc. can occur, thus resulting in a lack of product consistency and uniformity and lower quality, and (c) the colliding interaction of the product pieces not only causes marinade to flow out of the product but undesirably causes fat to flow out of the product as well.

Tenderization of meat muscle is usually performed by slashing or thin blade cutting the muscle, thus severing the connective collagen fibers. This reduces the toughness of the meat but also has a negative effect in that the overall structure is severely disturbed. A more natural tenderization method, much like the "hammering" of the meat commonly done in the home, is more desirable. However, this method damages the protein of the muscle.

Thus, a need presently exists for 1) an improved method of marinade infusion, 2) a continuous, real-time process which continuously delivers marinated meat directly into the processing line, and 3) a more effective, continuous method of tenderization which does not seriously either damage the muscle protein or disturb the overall structure of the product.

SUMMARY OF THE INVENTION

The present invention satisfies the needs and alleviates the problems discussed above. The invention provides an apparatus and continuous process for infusion of marination fluids, solutions (e.g., for curing, pickling, etc.), or any other type of treatment liquid into meat and food substances. The invention also provides a novel product produced by the inventive process. The inventive process will typically comprise the steps of: 1) controlled pressing to disrupt the natural framing matrix of the material's structure, and 2) massaging the food or meat substance while it is exposed, preferably either submerged or from a deluge, in a fluid to allow the liquid to be taken up into the structure.

The first step of the process preferably uses a squeezing method to break down the structure by pressing between two surfaces that can have varying degrees of softness. Each surface is preferably pliable and can conform to the shape of the material and surround that shape during pressing. Such shaping can also minimize hard surface contact points and high stress areas that may damage parts of the product such as bone corners. Care is taken to disrupt only the structural framework of the substance and not the individual protein fibers. Following the pressing step, the massaging step can utilize, for example, a submerged bath, in swirling flow currents, and fingers to manipulate the body of the material. This opens up the matrix, thus exposing the internal cavity for infusion of the marinade or other solution.

In one aspect, the present invention provides a method for treating food items having individual protein fibers at least partially covered by a collagen protein layer. The method comprises the step of pressing the food items using a pliable material which conforms to and at least partially surrounds the food items during the step of pressing. Pressure is applied to the food items in the step of pressing using the pliable material in a manner effective for rupturing the collagen protein layer sufficiently to form an opening therethrough.

In another aspect of the inventive method, the food items treated comprise muscle protein and the method comprises the step of pressing the food items between a first layer of a pliable material having a first surface and a second layer of a pliable material having a second surface. The first and second surfaces conform to and at least partially surround the food items while pressing. An amount of pressure is preferably applied to the food items in the step of pressing in the range of from about 2 to about 120 psig.

In another aspect, the present invention provides an apparatus for pressing food items comprising: a first rotatable, continuous belt having a contacting run, the contacting run having a contacting surface and a direction of travel; a second rotatable, continuous belt having a pressing run with a pressing surface adjacent to the contacting surface, the second belt being operable such that the pressing run will also move in the direction of travel; and at least a first roller position against the pressing run such that the first roller will urge the pressing surface toward the contacting surface in a manner effective for pressing food items as they are conveyed between the pressing run and the contacting run in the direction of travel. The first continuous belt is formed of a pliable material and the second continuous belt is formed of a pliable material such that the pressing surface and the contacting surface will conform to and at least partially surround the food items as the food items are pressed between the surfaces.

In another aspect, the present invention provides an apparatus for pressing food items comprising: a holding structure having a holding structure covering with a holding cover surface and a pressing structure having a pressing structure covering with a pressing cover surface. The pressing structure is reciprocatingly movable toward the holding structure for pressing food items between the pressing cover surface and the holding cover surface. The holding structure covering is formed of a pliable material and the pressing structure covering is formed of a pliable material such that the holding cover surface and the pressing cover surface will conform to and at least partially surround the food items as the food items are pressed between the surfaces.

In another aspect, the present invention provides an apparatus for infusing food items with a liquid comprising: a container for containing an amount of the liquid at a liquid level; a conveyor extending through at least a portion of the container beneath the liquid level such that the conveyor will continuously move the food items through the liquid; and a plurality of contact members positioned above and extending toward the conveyor such that the contact members will contact and massage the food items as they move through the liquid.

In another aspect, the present invention provides an apparatus for infusing food items with a liquid comprising: a drum rotatable with the liquid therein at a liquid level, the drum having spiral flites therein and a longitudinal opening extending through the flites such that the liquid level will extend partially into the longitudinal opening; and at least one paddle rotatably mounted in the longitudinal opening of the rotatable drum such that the paddle will contact the liquid.

In another aspect, the present invention provides an apparatus for treating food items comprising: a continuous press having two layers of pliable material between which the food items are receivable for pressing to produce a pressed product, the two layers having surfaces which will conform to and at least partially surround the food items when pressing. The apparatus further comprises a liquid infusion device having: a container for containing a liquid; a food conductor positioned to continuously conduct the pressed product through the liquid; and at least one contact member positioned in a manner effective to contact and massage the pressed product as it is continuously conducted through the liquid.

In yet another aspect, the present invention provides a method for treating food items having individual protein fibers at least partially covered by a collagen protein layer wherein the method comprises the steps of: (a) applying a force to said food items effective for rupturing the collagen protein layer sufficiently to form an opening therethrough and (b) infusing a treatment liquid into the food items through the opening preferably by impacting the food items while moving the food items through the treatment liquid.

The inventive continuous infusion system can provide liquid infusion/uptake levels of up to 50% or more by weight based upon the original weight of the product. The inventive system also significantly improves the degree of water binding within the product so that overall line yield can be increased by from about 10% to about 20% by weight over present yields. The inventive system also prevents fat and other desirable components from being forced out of the product.

The inventive system is fully adaptable to provide optimum treatment and fluid uptake for any type of product, whether poultry, meat, fish, or other, as well as for any particular type of product piece or cut. In this regard, the operating parameters of the inventive system can be varied, as desired, to optimize the ultimate amount of pressure applied, the rate of pressure increase, the number and duration of press repetitions, the direction of pressure application, the orientation of the product, etc. The inventive system can also be adapted to cause and optimize the movement of internal protein to the surface of the product.

In addition to these benefits and advantages, the inventive system eliminates or minimizes any damage to the muscle protein or overall structure of the product. Moreover, the inventive system can be operated at ambient pressure, thus eliminating the need to purchase, install, operate and maintain expensive vacuum pumps and other related equipment.

Further objects, features, and advantages of the present invention will be apparent to those skilled in the art upon examining the accompanying drawings and upon reading the following description of the preferred embodiments.

BRIEF DESCRIPTION OF THE DRAWINGS

FIG. 1 illustrates a plunger and cavity system employed in the present invention for pressing a product 2. FIG. 1 depicts the system in an open (i.e., nonpressing) position.

FIG. 2 illustrates the plunger and cavity system in a closed (i.e., pressing) position.

FIG. 4 illustrates a meat muscle structure prior to any pressing treatment.

FIG. 5 illustrates the meat muscle structure after being pressed in accordance with the present invention.

FIG. 6 illustrates the pressed meat muscle structure after the infusion stage of the inventive process.

FIG. 11 is an elevational side view of inventive infusion apparatus 180.

FIG. 12 is an elevational end view of a rotating drum 184 employed in inventive infusion apparatus 180.

DETAILED DESCRIPTION OF THE PREFERRED EMBODIMENTS

The inventive process preferably utilizes two stages. The first stage breaks down the framing structure and prepares the muscle of the meat or food material for infusion. The second stage is an infusion process.

Figure 3:
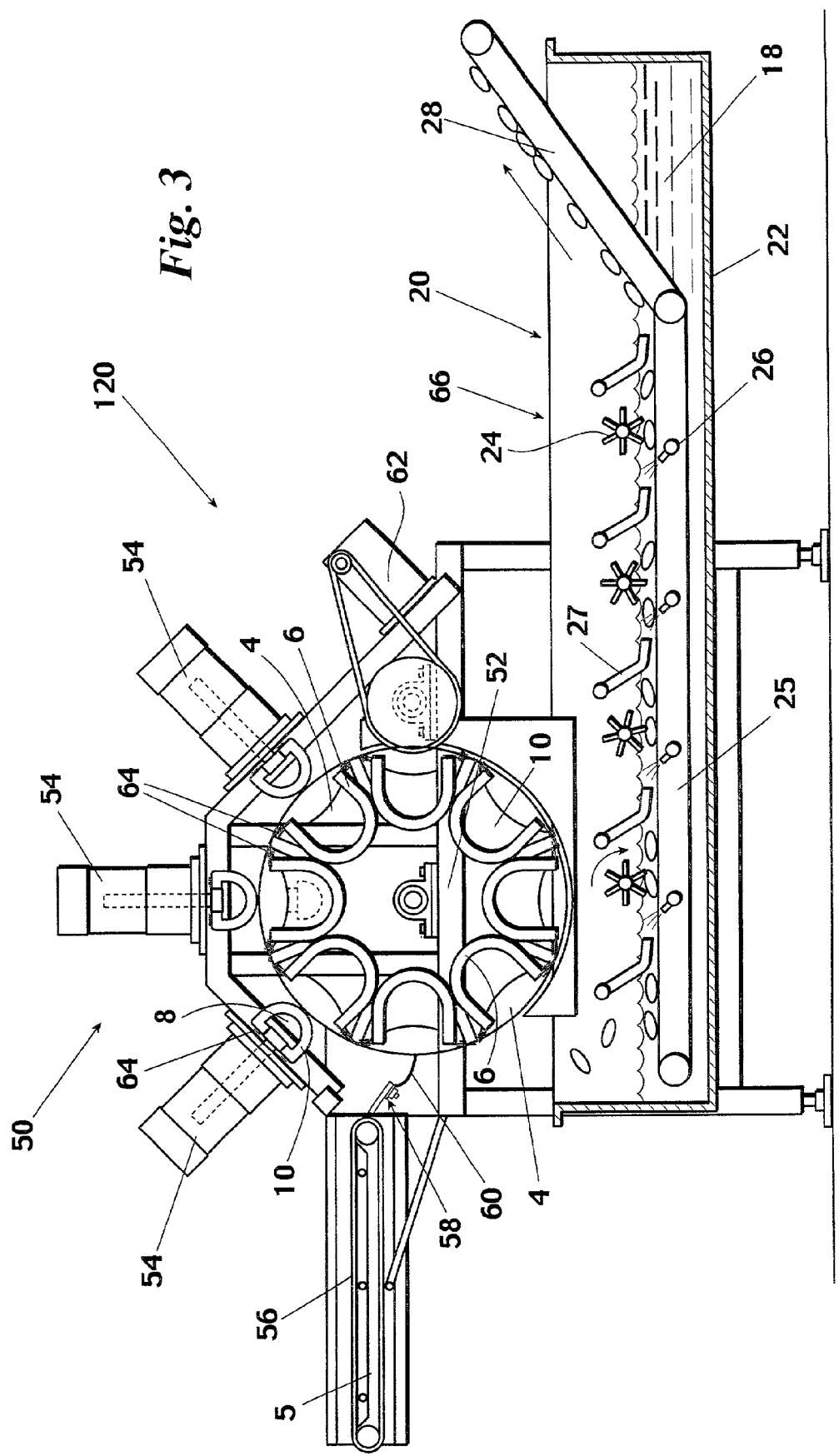
FIG. 3 illustrates an embodiment 50 of a continuous pressing apparatus provided by the present invention.

Stage #1: Structure Modification:

An embodiment 1 of an inventive apparatus for use in the first stage operation of the inventive method is depicted in FIGS. 1-3. Using inventive apparatus 1, the product, either food or meat 2, is brought into a compression area 4 (see FIGS. 1 and 2). This area preferably comprises two hard surfaces 6 and 8 that are covered with a thick pliable material 10. This material is selected to conform to the shape of the product 2, especially in the case of a non-homogeneous material such as a bone-in meat cut. These two surfaces preferably comprise a fixed surface 6 and a closing, movable surface 8. There is of course a force behind the movable surface such as a screw actuator, pneumatic or hydraulic cylinder, or other such mechanical device 54.

The fixed surface 6 will preferably be of a captive-type geometry, such as a "U" or "V" shaped trough, to control movement of the product. The moving surface 8 (e.g., a plunger as shown in FIGS. 1-3) will preferably have a corresponding profile shape. The product is brought into the compression area 4 by a conveyor 5.

The movable surface 8 is operated to meet the fixed surface 6, thus squeezing or pressing the product 2. Single or multiple presses 6 and 8 may be desirable depending on the working force of the press and the resistance of the connective tissues. It may also be desirable to spray marinade solution onto the product between presses to allow some infusion into the muscle structure. This aids in creating an unnatural tugor pressure inside the product which assists in beneficial structural breakdown.

Muscle structure is made up of protein fibers 12 which are encased in collagen protein layers 14 such as Perimysium and Endomysium sheaths (see FIG. 4). These bundles are combined together to form larger bundles, typically also bound in collagen protein sheaths, which make up the muscle fibers (Fasicle). In the inventive system, a normal (i.e., right angle) force is applied to these bundles such that the collagen protein layers and structural framework are stressed and broken down. This breakdown of the collagen layers and framework 14, and not the individual protein fibers 12, greatly reduces the binding forces holding the protein fibers in place. This in turn opens up the internal structure of the muscle fiber, thus allowing the marination solution to enter. In addition, once the collagen structure 14 is modified, thus disrupting the organized structure of the muscle, the protein fibers 12, which repel each other due to their similar charges, open up and thus provide more space for infusion of the marination. Further binding sites on the proteins 12 are desirably exposed for attachment of water.

This is a great improvement over conventional massaging systems which do not deal with the product structure directly. The inventive approach also serves to break down the collagen layers and framework of the meat that cause toughness, thus producing a more tender product. A tough cut of beef can be tenderized by this method without using a knife "slasher" to cut through the muscle fibers.

The thick pliable cover material 10 on both of surfaces 6 and 8 serves to surround the product with a flattening force. This is important because, in the case of meat, one objective of the inventive process is to create a normal force on the protein fibers, which minimizes damage to them. The durometer strength of the pliable covering 10 over the surfaces and the force bringing the movable surface 8 into the fixed surface 6 can be readily varied as necessary to provide generally any suitable bursting force desired for breaking down the collagen layers and structure. The compressive surrounding force provided by the inventive system essentially treats each product piece individually, which is a strong advantage over conventional massaging systems that treat all of the pieces in a bulk fashion. Examples of suitable pliable materials 10 include, but are not limited to: rubber, silicone, polyurethane, polyethylene, neoprene, or any industry available synthetic rubber. As will be understood by those skilled in the art, the pliable material 10 is preferably either a natural or synthetic rubber, for example, which is closed cell and cleanable.

As indicated above, the pressing or squeezing apparatus 1 provided by the present invention preferably comprises (a) a cavity 4 encased in a soft, thick, natural or synthetic rubber cover 10 and (b) a plunger 8 receivable in and having a shape corresponding to the shape of the cavity and preferably having the same thickness of the covering 10. The thickness of each covering 10 will typically be in the range of from about one-half to about one inch or more and will preferably be greater than the thickness of the product pieces 2. The durometer rating of the covering 10 will preferably be in the range of from about 20 to about 80, depending on the type of meat. For poultry and pork, a durometer rating of from about 20 to about 50 will preferably be used. For beef processing, the durometer rating of the coverings 10 will preferably be in the range of from about 40 to about 80. A durometer rating of from about 20 to about 30 will preferably be used when processing fish.

To provide continuous operation and throughput, the inventive pressing apparatus preferably comprises a plurality of pressing chambers 4 arranged in a linear or rotary fashion. An embodiment 50 of the inventive continuous apparatus is depicted in FIG. 3. Inventive apparatus 50 comprises a plurality of U-shaped pressing chambers 4 provided in a rotary bucket wheel 52. Apparatus 50 also includes a plurality of plungers 8 reciprocatingly positioned above bucket wheel 52. Plungers 8 employ mechanisms 54 for varying the pressure of the plungers 8 into cavities 4. As will be apparent to those skilled in the art, examples of suitable pressure mechanisms 54 include pneumatic or hydraulic cylinders having appropriate pressure regulators or mechanical pressing systems with associated force indicators and controls.

The inventive pressing apparatus preferably also includes: an infeed conveyor 56; a chute 58 with a flexible end piece 60 for delivering product 2 into rotating cavities 4; a motor and drive assembly 62 for driving bucket wheel 52; spray nozzles (not shown) before and after each pressing station for spraying marinade solution into cavities 4 before and after each press; rubber hold-down bars 64 removably attached on the plungers 8 and in the buckets 4 to fasten covers 10 to the plungers 8 and cavities 4 so as to maintain the functional position of covers 10 during operation and aid in the quick removal of covers 10 for cleanup; and an outflow conveyor assembly 66 for continuously receiving and conveying pressed product from wheel cavities 4.

In the inventive process, the overall effect on the integrity of the muscle tone is determined by the amount of pressing applied. Conventional tumblers do not begin to provide a comparable degree of structural break down to the product and result in only extraneous and surface infusion of marination. To obtain a comparable amount of external force on the product in a tumbler would require the same product be exposed to repeated pressures which would definitely disfigure the overall appearance of the muscle.

The force exerted by inventive apparatus 1 or 50 increases the internal (tugor) pressure of the product to a point sufficient to beneficially rupture the structural sheaths or other collagen layers 14 covering the fiber bundles 15 to thus create tears or other openings 17 for the infusion of marinade solution or other fluid. The soft, pliable coverings 10 employed in the inventive apparatus also allow much greater pressures to be applied to product 2 without damaging the protein fibers 12.

In addition, as opposed to the hammers and/or other hard pressing devices heretofore used in the art, the inventive apparatus does not apply pressure to the product in such an abrupt, instantaneous manner. Rather, the softness and/or thickness of the coverings 10 and the speed of plungers 8 can be varied as desired to: slow the rate of pressure buildup; allow the individual product pieces 20 to shift and/or equilibrate while pressing; cause the pressing force to be evenly distributed around the product pieces 20; and prevent any damage to the protein fibers 12, bones, skin, or overall structure of the product.

For any given type, piece, or cut of product, inventive apparatus 1 or 50 can be used to obtain optimal infusion and structural results by selectively adjusting or varying the ultimate amount of pressure applied, the rate or speed at which the final pressure is reached, the number of times the product is pressed, the amount and rate of pressure applied in each pressing step, and the direction of pressure application and/or the orientation of the product.

The embodiment of inventive apparatus 50 depicted in FIG. 3 includes three pressing plungers 8 which will allow each piece of product 20 to be pressed up to three times, assuming each individual plunger 8 presses the product 20 not more than once. Pressing and releasing the product 20 in this manner allows the muscle to recoil and present itself in a different configuration and/or position for additional pressing.

In Stage 1 of the inventive process, pressure is preferably applied to product 20 in an amount and at a rate effective for rupturing the sheaths or other layers of collagen protein without damaging the protein fibers. The amount and rate of pressure application will thus preferably exceed the yield strength of the collagen layers/sheaths without exceeding the hoop strength of the individual muscle proteins. In most cases, the amount and rate of pressure applied to the product will preferably be just under the hoop strength limit of the protein fibers 12.

Figure 8:
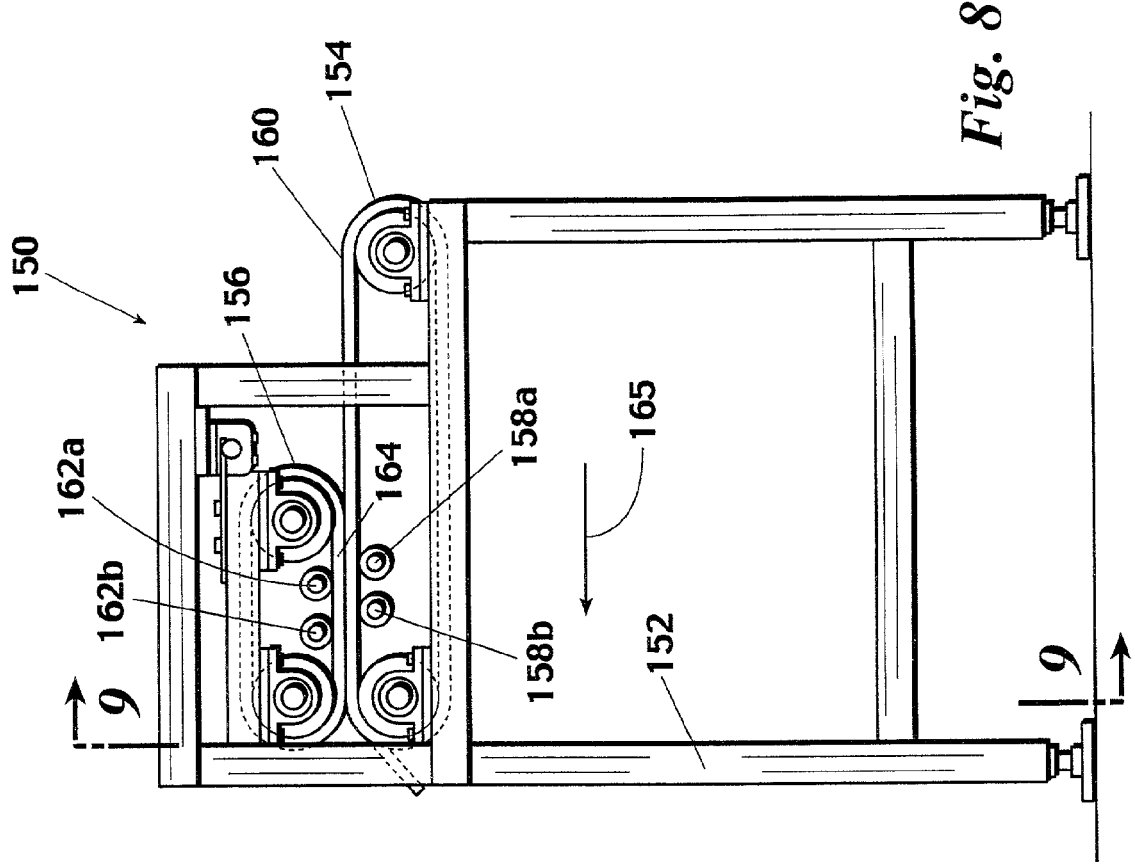
FIG. 8 is an elevational side view of embodiment 150 of a belt press provided by the present invention.
Figure 9:
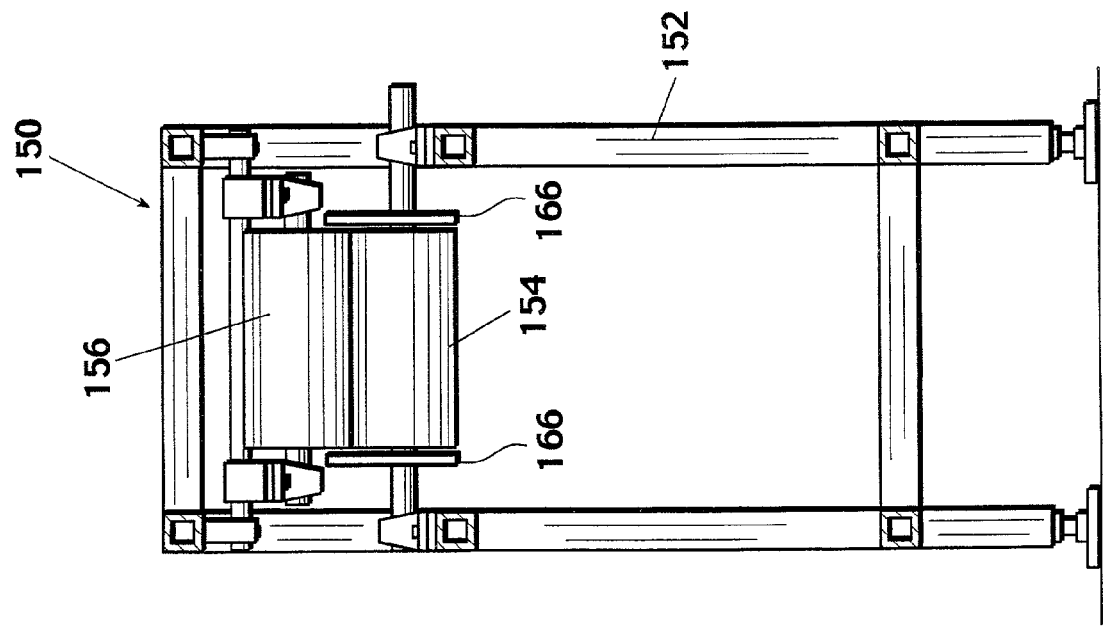
FIG. 9 is an elevational inlet end view of inventive belt press 150.

An alternative embodiment 150 of the inventive pressing apparatus is depicted in FIGS. 8 and 9. Inventive pressing apparatus 150 is a double conveyor device which preferably comprises: a frame or other support structure 152; a lower continuous belt 154 rotatably mounted in frame 152; an upper continuous belt 156 rotatably mounted in frame 152 above lower belt 154; at least one pressing roller (preferably at least two) 158 adjustably positionable beneath and against the upper carrying run 160 of lower belt 154; at least one upper pressing roller (preferably at least two) 162 adjustably positionable above and against the lower pressing run 164 of upper belt 156; and vertical containment walls 166 positioned on each side of belts 154 and 156 for retaining product carried through inventive apparatus 150. As will be understood by those skilled in the art, inventive apparatus 150 will also include motors, belts, chains, sprockets and/or pulleys for directly or indirectly driving belts 154 and 156.

The belts 154 and 156 will typically be driven in counter rotation such that carrying run 160 and pressing run 164 move in the same direction of travel 165. The speeds of belts 154 and 156 will preferably be substantially identical. However, if desired, the belts could be driven at different speeds in order to cause the product to roll or turn while being pressed and conveyed through inventive apparatus 150. Lower belt 154 is preferably longer than upper belt 156 so that the food items can be conveniently and continuously placed on the upstream portion of carrying run 160 and then carried into upper belt 156 for pressing.

As with the coverings 10 employed in inventive apparatus 1, the lower belt 154 and upper belt 156 of inventive apparatus 150 are preferably each formed of a thick, pliable material of the type described above which will surround the product as the inventive pressure treatment is applied. The material will most preferably be a natural or synthetic material or similar closed cell substance which is readily cleanable. In addition, at least one of the belts 154 or 156 (typically upper belt 156) will preferably be vertically movable with respect to the other so that, if desired, a gap of adjustable width can be created between the belts. As will be understood by those skilled in the art, the gap can be set by hand or could be set using hydraulic or pneumatic cylinders and controls which will also operate to maintain a more constant pressure during the course of the continuous pressing operation.

The pressing rollers 158 and 162 employed in inventive apparatus 150 act against and restrict belts 154 and 156 to thereby press and massage the product conveyed through inventive apparatus 150. To optimize the treatment of the particular product conveyed through inventive apparatus 120, the rollers 158 and 162 can be selectively moved toward or away from each other (a) in the vertical direction and/or (b) horizontally along (i.e., with or against) the direction of travel 165. The positions of the pressing rollers 158 and/or 162 can also be set by hand or by the use of hydraulic or pneumatic cylinders and controls.

Thus, for example, to decrease the amount of pressure applied to the product conveyed through inventive apparatus 150, the operator can (a) raise upper rollers 162 with respect to lower rollers 158, (b) raise upper belt 156 with respect to lower belt 154 to provide a gap therebetween of desired width and/or (c) move the rollers 162 and/or 158 along the direction of travel 165 such that the upper and lower rollers are in staggered positions as depicted in FIG. 8. On the other hand, if it is desired to increase the amount of pressure applied to the product in inventive apparatus 150, the operator can (a) lower upper rollers 162 with respect to rollers 158, (b) decrease or eliminate the gap between belts 156 and 154 and/or (c) move the rollers 162 and/or 158 horizontally so that the rollers are in or at least closer to a vertically aligned (i.e., non-staggered) position. In addition, the rate of pressure increase through inventive apparatus 150 can be selectively slowed or accelerated by positioning the initial pair of upper and lower rollers 162a and 158a such that they are further apart (horizontally and/or vertically) from each other than are the trailing rollers 162b and 158b.

In practicing the inventive process, the inventive plunger apparatus 1 or 50 and the inventive belt press apparatus 150 are each individually well suited for treating generally any type of product and any type of product piece or cut. The ultimate pressure applied to each piece or cut will typically be in the range of from about 2 to about 120 psig.

The inventive plunger apparatus 1 or 50 is particularly well suited for treating bone-in products, beef briskets, poultry wings, and other products having high collagen structural definition and therefore will benefit from higher pressure treatments. The pressure applied to such products using inventive apparatus 1 or 50 will typically be in the range of from about 15 to about 120 psig.

The inventive belt apparatus 150 is particularly well suited for treating products such as sirloin cuts and boneless products, e.g., breast filets and poultry tenderloins, which have less structural definition and will therefore benefit from softer press treatments. The pressure applied to such products using inventive apparatus 150 will typically be in the range of from about 2 to about 100 psig.

In an alternative embodiment of the present invention, the inventive belt apparatus 150 and the inventive plunger apparatus 1 or 50 can be used in series to increase the number and type of presses applied to a given product. The use of the inventive devices in series is particularly effective for reorienting the product muscle and changing the direction of press by transferring the product from one apparatus to another. When using the pressing devices in series, it will typically be preferred that the belt press 150 be used first to provide a softer initial press and that the inventive plunger apparatus 1 or 50 then be used to provide one or more presses of greater intensity.

The second stage of the preferred marination process is described hereinbelow. However, before beginning this discussion, we note that the "Stage 1: Structure Modification" procedure and each of the pressing apparatuses 1, and 50, and 150 described above are stand-alone inventions, in and of themselves, which can be advantageously used alone or in combination with numerous other processes and procedures.

The inventive modification provided by inventive apparatus 1 or 50, inventive apparatus 150, or a combination thereof, can be utilized, for example, as a pretreatment to prepare meat or a food substance for conventional infusion or marination processes such as vacuum tumbling or needle injection. Since the inventive structure modification process greatly opens up the structure of the material, vacuum tumbling and needle injection would be greatly enhanced. In the case of vacuum tumbling, current methods only add marinade to the surface with slight infusion into the muscle structure. This is due to the tightness of the framework not allowing physical movement. The structural modification of the inventive process opens up the structure and allows two to three times the infusion rate.

In the case of needle injection, very small diameter needles, arranged in an array, pierce the product and, under high pressure, inject marinade and/or other solutions into the product. Again, with the tight structure, the effective injection area is localized within only a small sphere around the needle tip. The inventive modification greatly enhances needle injection by providing a much less resistant structure and better flow distribution of the marinade or other liquid into the muscle.

Figure 7:
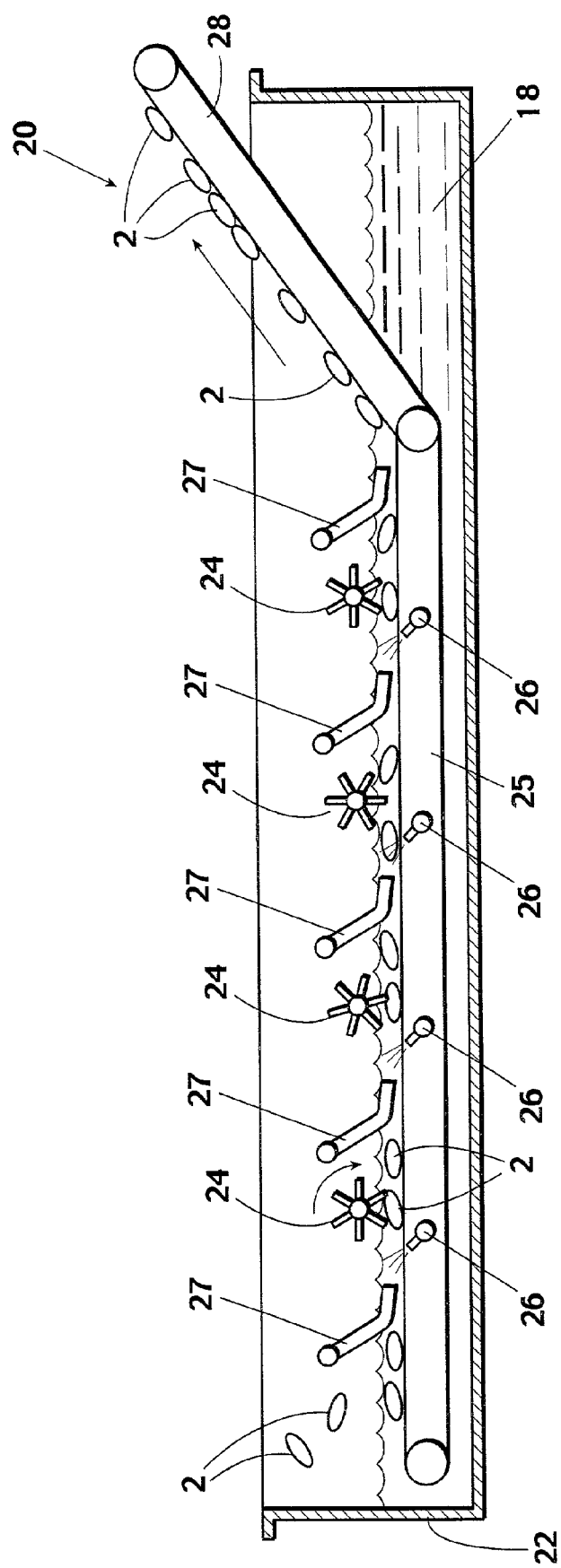
FIG. 7 illustrates an embodiment 20 of a liquid (e.g., marinade) infusion apparatus provided by the present invention.

Stage #2: Infusion of Marination:

Once the collagen protein structure (e.g., the Perimysium and Endomysium sheaths and cross linking collagen fibers) has been broken down, the product 2 is exposed to a bath or deluge of treatment liquid 18 (e.g., a marination solution). An embodiment 20 of the inventive marinade infusion system is depicted in FIGS. 3 and 7. Since the structure of the meat 2 has been collapsed and compressed due to the press treatment in stage 1, the inventive infusion system 20 assists in opening it up. This is accomplished by gently massaging each piece with swirling eddy currents and drag fingers 27.

In inventive system 20, the product 2 enters a flooded tank 22 and is conveyed past drag fingers 27 which roll the product 2. This disrupts the compressed state of the structure and causes it to open up, much like straightening out a flattened box. During this rolling process, the product is exposed to swirling currents that are created by paddles 24 and spray nozzles 26. This combination of treatments opens the structure of the product, thus presenting the marination solution to the inside of the meat. It also serves to partially wash the broken connective tissues out of the structure. The resultant condition is a very soft and fluffy composition of muscle protein with a very high infusion of marination or other treatment fluid (see FIG. 6).

The inventive marinade infusion system 20 also comprises: a conveyor belt 25 in the marination infusion tank 22 to convey the pressed product 2 submerged in the marinade solution 18 during the infusion process; and conveyor take-out section 28 to remove the product from the infusion process. The nozzles 26 beneath the conveyor 25 also operate to impinge marinade solution directly onto the product during conveyance through the infusion process.

An alternative embodiment 180 of the inventive infusion apparatus is depicted in FIGS. 10-13. Like inventive apparatus 20, inventive infusion apparatus 180 provides a "wet" infusion system. Throughout the infusion process, the individual product pieces preferably remain in suspension (or at least a semi or partially suspended state) in an excess amount of the infusion fluid. Although the specific gravity of the individual product pieces will typically exceed that of the fluid, the suspended or semi-suspended state of the product is preferably maintained in each of apparatuses 20 and 180 by creating fluid circulation and turbulence within the apparatus and by contacting the individual pieces with paddles, fingers, or other devices which preferably impart a rolling movement to the product.

Inventive infusion apparatus 180 preferably comprises: a holding tank 182 wherein a desired level of marination fluid or other infusion liquid is maintained using conventional level control devices and/or instruments; a rotating drum 184 mounted in holding tank 182; continuous spiral (preferably screw-type) flites 186 mounted on the interior wall 190 of rotating drum 184 for moving the product through apparatus 180; a plurality of longitudinal lift bars or rods 188 spaced around and extending along the length of the interior wall 190 of rotating drum 184; a longitudinal paddle wheel 192 extending through and mounted for counter-rotation in rotating drum 184; an elevator or other conveyor apparatus 194 provided at the inlet end of rotating drum 184 for continuously delivering the product into the rotating drum; a slide chute 196 provided at the exit end of rotating drum 184 for discharging the marinated product from inventive apparatus 180; and a plurality of interior scoops or shelves 198 provided around the interior of the exit end of rotating drum 184 for lifting the product onto slide chute 196.

Figure 13:
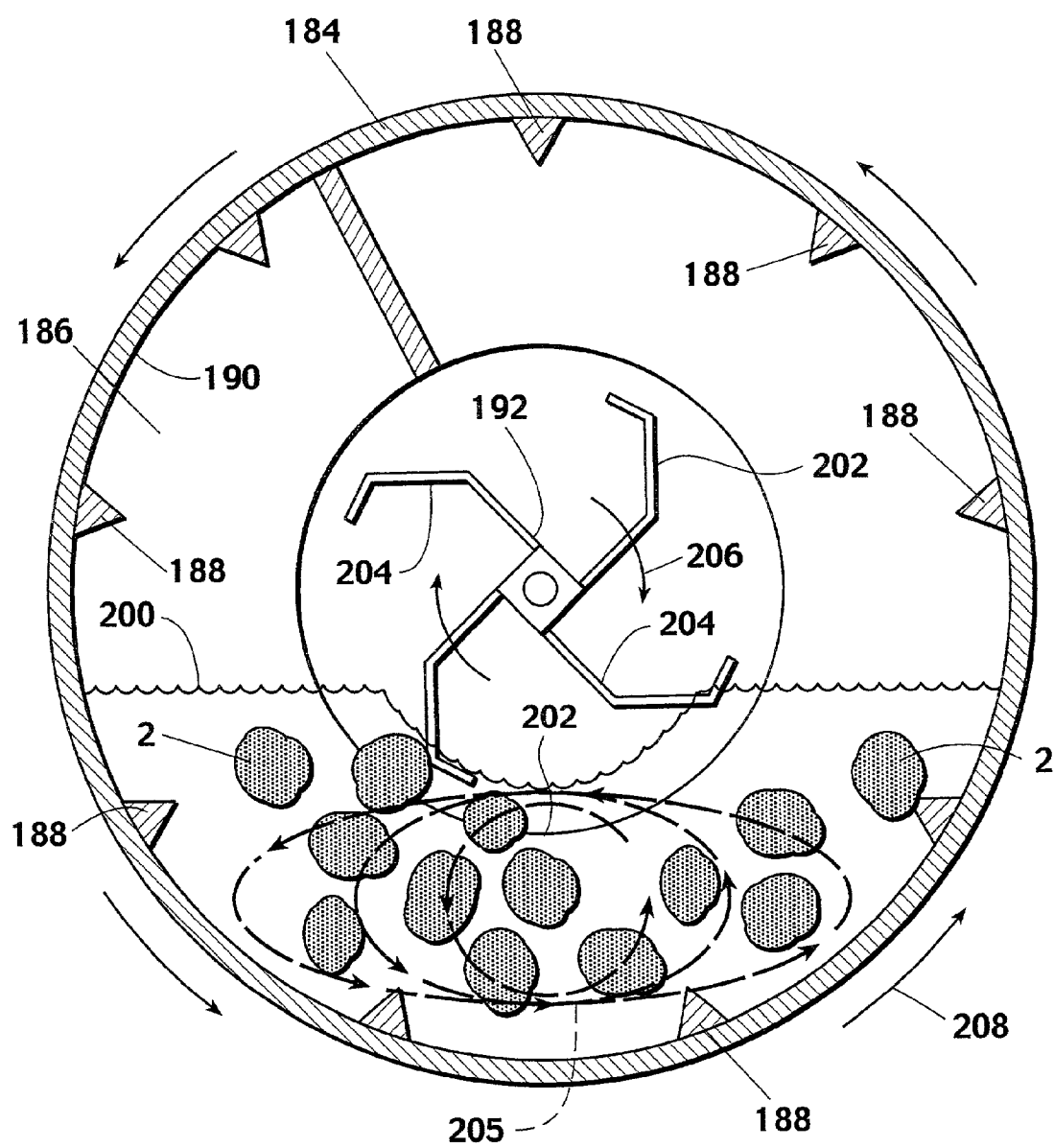
FIG. 13 is a schematic elevational end view of rotating drum 184 having a paddle wheel 192 positioned therein.

As illustrated in FIG. 13, the liquid level 200 within inventive apparatus 180 is preferably maintained at a point above the lowermost interior edge 202 of flites 186 so that the liquid is contacted and acted upon by the paddles 204 of the interior paddlewheel 192.

Figure 10:
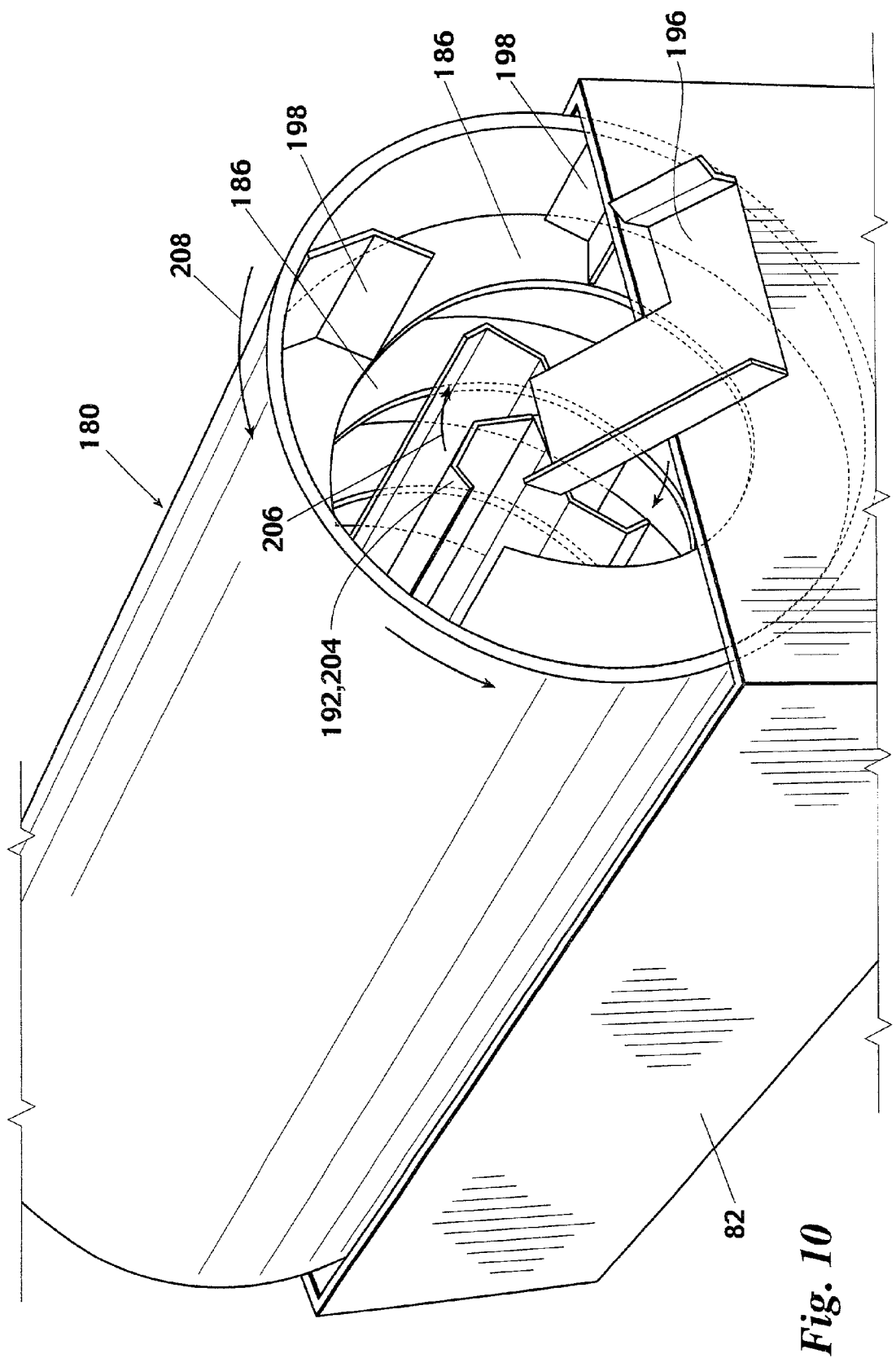
FIG. 10 is a perspective inlet end view of a liquid infusion apparatus 180 provided by the present invention.

As illustrated in FIGS. 10 and 13, the projecting paddles 204 of interior paddlewheel 192 are preferably swept back (i.e., curved, angled, and/or bent away) from the direction of rotation 206 of paddlewheel 192. In addition, the rotational direction 206 of paddlewheel 192 is preferably counter to direction of rotation 208 of drum 184. The rotating paddles 204 desirably operate to (a) circulate the fluid within each of the adjacent carrier sections 210 formed in the bottom of the drum by adjacent flites 186, (b) hold the product 2 within the flite sections 210 so that it is continuously conveyed in a uniform manner through rotating drum 184 and (c) contact the individual pieces 2 of the product as they are conveyed through the apparatus so as to massage and assist in infusing material into the pieces and to impart a rolling motion 205 to the suspended product.

The longitudinal lift bars 188 provided around the interior of rotating drum 184 also assist in lifting and suspending (and also assist to some extent in massaging) the product pieces 2 and enhancing fluid circulation within the flite carrier sections 210. Although generally any shape or type of lifting rod or bar could be used in inventive apparatus 180, the lifting bars 188 will preferably have a triangular cross-sectional shape of the type depicted in FIGS. 12 and 13.

As with inventive apparatus 20 (and in contrast to the dry marination systems used heretofore), inventive apparatus 180 provides a wet infusion treatment which treats the separate product pieces in primarily an individual rather than a bulk manner. Thus, the high internal (tugor) pressures created in the prior art systems are not created in inventive apparatuses 20 or 180. The suspended product can therefore receive and hold a much greater amount of infusion material. Moreover, the infused material is not limited to the surface region of the product but is uniformly distributed throughout the muscle.

The paddles 204 of inventive apparatus 10 repeatedly and randomly contact the individual product pieces 2 numerous times to thus ensure a consistent, uniform, high level of infusion throughout each piece. In addition, the type of impact provided by the paddles 204 against the individual suspended or semi-suspended product pieces 2 is particularly effective for massaging and infusing liquid into the pieces. For each of the numerous random impacts which occur, the paddles 204 operate to push liquid material present within the product at the point of contact further into the muscle structure. Then, immediately following the impact, the contacted muscle at the point of contact again expands, similar to a sponge, to pull additional liquid into the product. Further, in contrast to the prior art bulk tumbling systems used heretofore, the impacting and massaging action of the paddles 204 does not damage the surface of the product.

Figure 14:
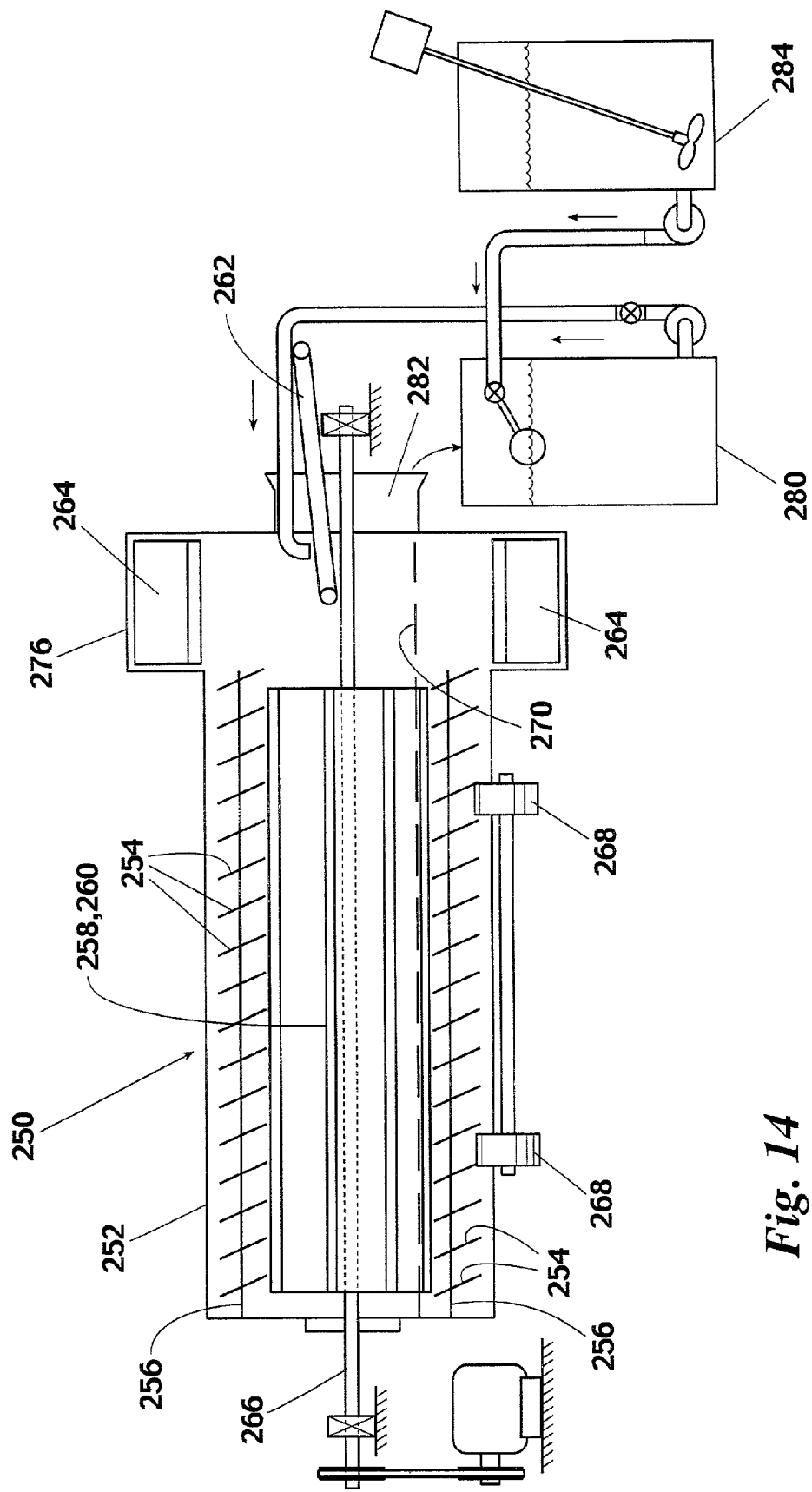
FIG. 14 is a schematic elevational side view of an embodiment 250 of the infusion apparatus provided by the present invention.
Figure 15:
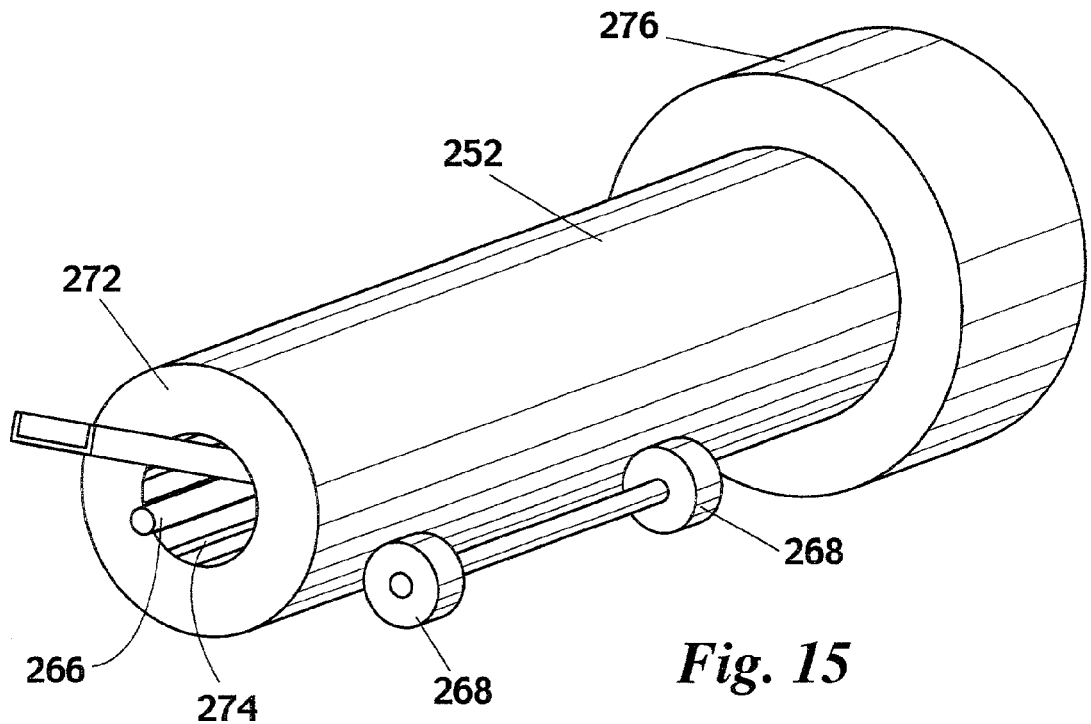
FIG. 15 is a perspective inlet end view of a rotating drum 252 employed in inventive apparatus 250.
Figure 16:
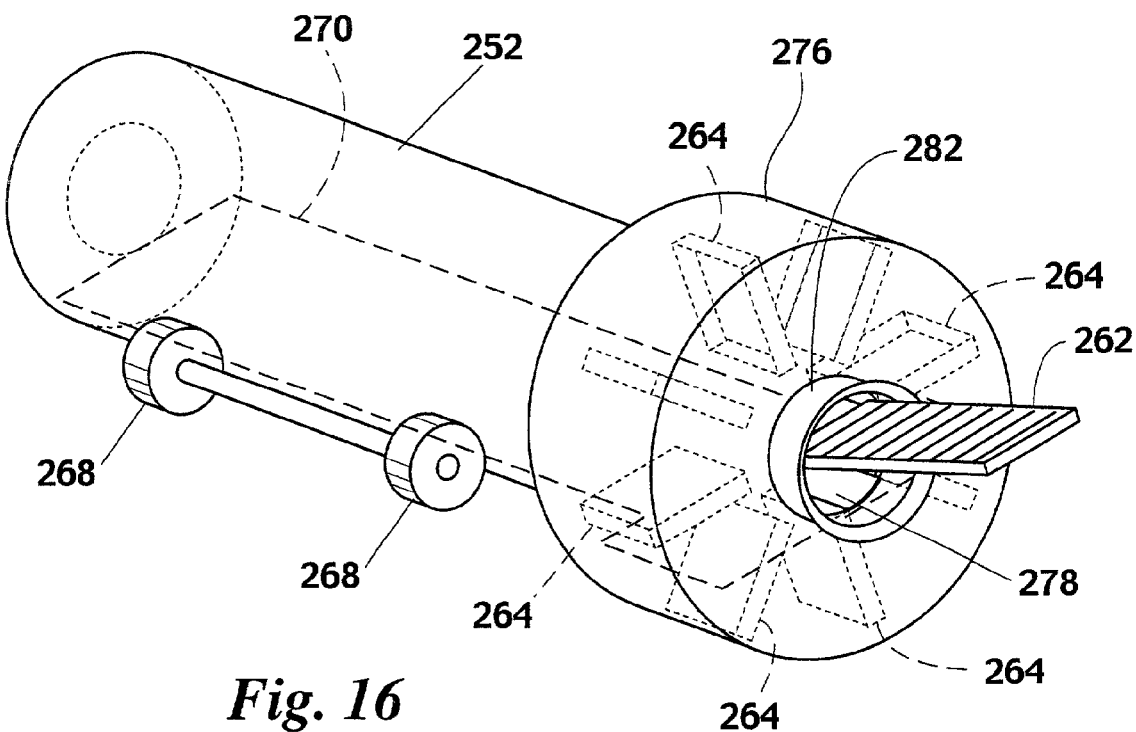
FIG. 16 is a perspective outlet end view of rotating drum 252.

An alternative embodiment 250 of the inventive rotating drum apparatus is depicted in FIGS. 14-16. Like inventive apparatus 180, the inventive rotating drum apparatus 250 preferably comprises: a rotating drum 252; continuous spiral (preferably screw-type) flites 254 mounted in rotating drum 252; a plurality of lift bars or rods 256 spaced around and extending along the length of the interior of rotating drum 252; a longitudinal paddle wheel 258 extending through and mounted for counter rotation in rotating drum 252; at least one (preferably a plurality) of swept back elongate paddles 260 projecting from and extending along paddle wheel 258; a slide chute or conveyor 262 provided at the exit end of rotating drum 252 for discharging the treated product; a plurality of interior scoops or shelves 264 provided around the interior of the exit end of rotating drum 252 for lifting the product onto the slide chute or conveyor 262; and a drive shaft or other mechanism 266 extending into rotating drum 252 for driving paddle wheel 258. Paddle wheel 258 is preferably driven in counter rotation to rotating drum 252. Conventional drum rollers 268 or other common devices can be used for driving the rotation of rotating drum 252.

Unlike inventive apparatus 180, the alternative apparatus 250 does not include a separate liquid tank in which the rotating drum is mounted. Rather, the rotating drum 252 itself serves as the liquid container. The liquid level 270 in the rotating drum 252 of alternative apparatus 250 is maintained by: a donut wall 272 provided at the inlet end of rotating drum 252 for retaining the liquid within the drum; a circular opening 274 provided in the end wall 272 which will not allow the liquid to flow out of the inlet end of the drum but is large enough to receive the inlet chute/conveyor and the paddle wheel drive mechanism; an enlarged outlet end section 276 provided on rotating drum 252 to act as a liquid sump; an outlet end opening 278 which is larger than inlet opening 274 and acts as a liquid level control device by allowing excess liquid to continuously flow out of drum 252; a fill tank, pump, and return pipe assembly 280 preferably positioned at the outlet end of drum 252 for receiving the flow of excess liquid from drum outlet opening 272 and recirculating the liquid into drum 252; a circular flow spout or collar 282 which extends from and rotates with outlet opening 278 to assist in directing the flow of liquid from drum 252 into the fill tank 280; and a make up tank and pump assembly 282 for adding supplemental marinade or other treatment solution as needed to maintain a desired liquid level in fill tank 280.

In inventive apparatus 250, the rate of liquid addition to rotating drum 252 from fill tank assembly 280 will preferably be relatively low so as to ensure a fairly constant liquid level and to prevent product from floating out of drum 252 with the overflow. If desired, a partial screen (e.g., a screen ring) can be provided within outlet opening 278 to prevent the product from leaving with the overflow material.

In each of inventive infusion apparatuses 20, 80, and 250, the infusion fluid will typically be present in an amount of at least one pound of fluid per pound of product and more preferably an amount in the range of from about one pound of fluid per pound of product to about six pounds of fluid per pound of product. The infusion fluid will most preferably be present in an amount in the range of from about two pounds of fluid per pound of product to about five pounds of fluid per pound of product. The higher liquid ratios are effective for maximizing the amount of liquid infusion and are particularly desirable where it is not necessary to extract any significant amount of protein to the surface of the product. Lower liquid ratios, on the other hand, will typically be preferred for processing ham muscles, trim or other products where extraction of internal protein to the surface is needed. In such cases, the liquid ratio should be low enough to allow the pieces to rub against each other so as to obtain the desired degree of extraction.

The residence time of the product within the inventive infusion apparatus can be adjusted as necessary to obtain generally any amount of infusion, massaging, and/or other results desired. As will be understood by those skilled in the art, the residence time of the product and the liquid-to-product ratio employed in inventive apparatus 180 or 250 can each be established or adjusted as necessary by (a) changing the rate of product feed to the unit, (b) changing the speed of rotation of rotating drum 184 or 252, (c) changing the liquid level within limits necessary to maintain acceptable paddle contact, and/or (d) enlarging or reducing the size of the flite carrier sections 210 by changing the spacing between the flites 186 or 254.

In practicing the present invention, one or a combination of the inventive pressing apparatuses 1, 50, and/or 150 can be used interchangeably with the inventive infusion apparatuses 20, 180, and/or 250. By way of example but not by way of limitation, an embodiment 120 of the inventive pressing and infusion system as depicted in FIG. 3 comprises inventive pressing apparatus 50 positioned above the leading end of inventive infusion apparatus 20 so that the pressed product falls directly from the press cavities 4 into the infusion tank 22.

Figure 17:
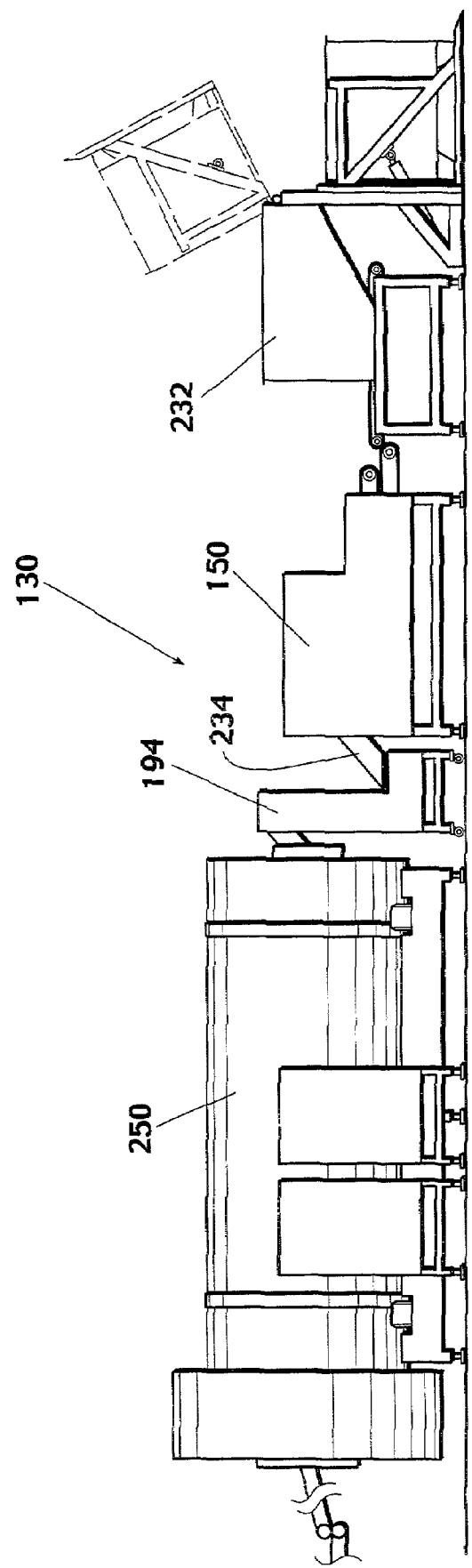
FIG. 17 schematically illustrates an embodiment 130 of the inventive apparatus and process comprising an inventive belt press 150 and an inventive infusion apparatus 250.

As another example, an alternative embodiment 130 of the inventive pressing and infusion system as depicted in FIG. 17 comprises: a feed hopper and conveyor 232; an inventive belt press 150 which continuously receives the product from the feed conveyor; a discharge chute 234 provided at the outlet end of belt press 150; an inventive infusion apparatus 250; and an elevator 194 which continuously lifts the product from the belt press discharge chute 234 into infusion apparatus 250.

It will also be understood by those skilled in the art that each of inventive infusion apparatuses 20, 180, and 250 can alternatively be used alone or in combination with other processes or procedures. For example, in accordance with the inventive method, any of the various embodiments of the inventive infusion apparatus 20, 180, or 250 can be used in the manner described above to infuse marinade or any other treatment liquid into generally any muscle product wherein the collagen protein layers thereof are first ruptured to form openings therethrough. Although it is preferred that the rupturing step be performed using one or a combination of the pressing apparatuses 1, 50, and/or 150 described above, generally any system or approach effective for applying a rupturing force to or otherwise opening the collagen can be used. Examples include, but are not limited to, hammering and hard pressing.

Thus, the present invention is well adapted to carry out the objects and attain the ends and advantages mentioned above as well as those inherent therein. While presently preferred embodiments have been described for purposes of this disclosure, numerous changes and modifications will be apparent to those skilled in the art. Such changes and modifications are encompassed within the spirit of this invention as defined by the appended claims.

What is claimed is:

1. A method of treating food items having individual muscle protein fibers at least partially covered by a collagen protein layer, said method comprising the step of pressing said food items using a pliable material which conforms to and at least partially surrounds said food items during said step of pressing, wherein pressure is applied to said food items in said step of pressing using said pliable material in a manner effective for rupturing said collagen protein layer sufficiently to form an opening therethrough.

2. The method of claim 1 wherein, in said step of pressing, said food items are pressed between a first layer of said pliable material having a first surface and a second layer of a pliable material having a second surface.

3. The method of claim 2 wherein said first and said second surfaces conform to said food items in said step of pressing to at least partially surround said food items.

4. The method of claim 3 wherein said first and said second surfaces completely surround said food items in said step of pressing.

5. The method of claim 3 wherein said first layer is a covering for a plunger and said second layer covers at least an interior portion of a cavity wherein said plunger is receivable for pressing said food items.

6. The method of claim 3 wherein said food items are pressed in said step of pressing between a first continuous belt comprising said first layer and a second continuous belt comprising said second layer.

7. The method of claim 6 wherein said pressure is applied to said food items in said step of pressing by contacting said first continuous belt with at least a first roller which urges said first continuous belt toward said second continuous belt and by contacting said second continuous belt with at least a second roller which urges said second continuous belt toward said first continuous belt.

8. The method of claim 2 wherein said food items are bone-in product pieces and said pressure applied in said step of pressing is in the range of from about 15 to about 120 psig.

9. The method of claim 2 wherein said food items are boneless product pieces and said pressure applied in said step of pressing is in the range of from about 2 to about 100 psig.

10. The method of claim 1 wherein said step of pressing comprises a series of at least two applications of pressure to said food items using said pliable material.

11. The method of claim 1 further comprising the step, following said step of pressing, of infusing a treatment liquid into said food items through said opening.

12. The method of claim 11 wherein said step of infusing comprises vacuum tumbling said food items.

13. The method of claim 11 wherein said step of infusing comprises needle injecting said treatment liquid into said food items.

14. The method of claim 11 wherein said step of infusing comprises impacting said food items while moving said food items through said treatment liquid.

15. The method of claim 14 wherein, in said step of infusing, said food items are at least partially suspended in an amount of said treatment liquid of at least one pound of said treatment liquid per pound of said food items.

16. The method of claim 14 wherein, in said step of infusing, said food items are continuously moved through said treatment liquid by a submerged conveyor.

17. The method of claim 16 wherein said food items are impacted in said step of infusing by contacting with flexible fingers as said food items are carried through said treatment liquid.

18. The method of claim 14 wherein, in said step of infusing, said food items are continuously moved through said treatment liquid by rotating spiral flutes.

19. The method of claim 18 wherein said food items are impacted in said step of infusing by contacting with at least one rotating paddle.

20. The method of claim 19 wherein said paddle rotates in a direction opposite that of said spiral flutes.

21. A method of treating food items, said food items comprising muscle protein and said food items being not frozen, said method comprising the step of pressing said food items between a first layer of a pliable material having a first surface and a second layer of a pliable material having a second surface, wherein said first and said second surfaces conform to and at least partially surround said food items in said step of pressing and wherein an amount of pressure is applied to said food items in said step of pressing in the range of from about 2 to about 120 psig.

22. The method of claim 21 wherein said food items are bone-in product pieces and said amount of pressure applied in said step of pressing is in the range of from about 15 to about 120 psig.

23. The method of claim 21 wherein said food items are boneless product pieces and said amount of pressure applied in said step of pressing is in the range of from about 2 about 100 psig.

24. The method of claim 21 wherein said food items are pressed in said step of pressing between a first continuous belt comprising said first layer and a second continuous belt comprising said second layer.

25. The method of claim 24 wherein said pressure is applied to said food items in said step of pressing by contacting said first continuous belt with at least a first roller which urges said first continuous belt toward said second continuous belt and by contacting said second continuous belt with at least a second roller which urges said second continuous belt toward said first continuous belt.

26. The method of claim 21 wherein each of said first and said second layers has a thickness of at least one-half inch.

27. The method of claim 21 further comprising the step, following said step of pressing, of infusing a treatment liquid into said food items.

28. The method of claim 27 wherein said step of infusing comprises vacuum tumbling of said food items.

29. The method of claim 27 wherein said step of infusing comprises needle injecting said treatment liquid into said food items.

30. The method of claim 27 wherein said step of infusing comprises impacting said food items while moving said food items through said treatment liquid.

31. The method of claim 30 wherein, in said step of infusing, said food items are at least partially suspended in an amount of said treatment liquid of at least one pound of said treatment liquid per pound of said food items.

32. The method of claim 30 wherein said food items are impacted in said step of infusing by contacting with flexible fingers as said food items are moved through said treatment liquid.

33. The method of claim 30 wherein, in said step of infusing, said food items are continuously moved through said treatment liquid by rotating spiral flites.

34. The method of claim 33 wherein said food items are impacted in said step of infusing by contacting with at least one rotating paddle.

35. The method of claim 34 wherein said paddle rotates in a direction opposite that of said spiral flites.

36. A method of treating food items having muscle protein, said food items being not frozen and said method comprising the step of pressing said food items using a pliable material which conforms to and at least partially surrounds said food items during said step of pressing and wherein an amount of pressure is applied to said food items in said step of pressing of at least 2 psig.

37. The method of claim 36 wherein said step of pressing comprises a series of at least two applications of pressure to said food items using said pliable material.

38. The method of claim 36 further comprising the step, following said step of pressing, of infusing a treatment liquid into said food items.

39. The method of claim 38 wherein said step of infusing comprises vacuum tumbling said food items.

40. The method of claim 38 wherein said step of infusing comprises needle injecting said treatment liquid into said food items.

41. The method of claim 38 wherein said step of infusing comprises impacting said food items while moving said food items through said treatment liquid.

42. The method of claim 41 wherein, in step of infusing, said food items are continuously moved through said treatment liquid by a submerged conveyor and wherein said food items are impacted in said step of infusing by contacting with flexible fingers as said food items are carried through said treatment liquid.

43. The method of claim 38 wherein, in said step of infusing, said food items are continuously moved through said treatment liquid by rotating spiral flites.

44. The method of claim 43 wherein said food items are impacted in said step of infusing by contacting with at least one rotating paddle which rotates in a direction opposite that of said spiral flites.

45. A method of treating food items having muscle protein, said method comprising the step of pressing said food items using a pliable material which conforms to and completely surrounds said food items during said step of pressing and wherein an amount of pressure is applied to said food items in said step of pressing in the range of from about 2 to about 120 psig.

46. The method of claim 45 wherein said food items are bone-in product pieces and said pressure applied in said step of pressing is in the range of from about 15 to about 120 psig.

47. The method of claim 45 wherein said food items are boneless product pieces and said pressure applied in said step of pressing is in the range of from about 2 to about 100 psig.

48. A method of treating food items, said food items comprising muscle protein and said method comprising the step of pressing said food items between a first layer of a pliable material having a first surface and a second layer of a pliable material having a second surface, wherein said first and said second surfaces conform to and at least partially surround said food items in said step of pressing, wherein an amount of pressure is applied to said food items in said step of pressing in the range of from about 2 to about 120 psig, and wherein said first layer is a cover for a plunger and said second layer covers at least an interior portion of a cavity wherein said plunger is receivable for pressing said food items.

* * * * *

UNITED STATES PATENT AND TRADEMARK OFFICE
CERTIFICATE OF CORRECTION

PATENT NO. : 7,381,438 B2  Page 1 of 1
APPLICATION NO. : 09/909913
DATED : June 3, 2008
INVENTOR(S) : Anders et al.

It is certified that error appears in the above-identified patent and that said Letters Patent is hereby corrected as shown below:

On the Title Page item (73) should read

(73) Assignee: AK Food Technology, Inc., Springdale, AR

Signed and Sealed this

Fifth Day of August, 2008

JON W. DUDAS
*Director of the United States Patent and Trademark Office*